United States Patent [19]

Yadlowsky

[11] 4,430,353
[45] Feb. 7, 1984

[54] LOW-GRADE COFFEE

[75] Inventor: Slawko Yadlowsky, Manville, N.J.

[73] Assignee: General Foods Corporation, White Plains, N.Y.

[21] Appl. No.: 439,966

[22] Filed: Nov. 8, 1982

[51] Int. Cl.³ .............................................. A23F 5/16
[52] U.S. Cl. .................................... 426/388; 426/430; 426/428; 426/595
[58] Field of Search ....................... 426/430, 428–429, 426/388, 595

[56] References Cited

U.S. PATENT DOCUMENTS

| | | | |
|---|---|---|---|
| 4,113,886 | 9/1978 | Katz | 426/428 X |
| 4,226,891 | 10/1980 | Lewis | 426/430 |
| 4,234,613 | 11/1980 | Lewis | 426/430 |
| 4,237,288 | 12/1980 | Rushmore | 426/428 X |

FOREIGN PATENT DOCUMENTS

| | | | |
|---|---|---|---|
| 2836304 | 1/1979 | Fed. Rep. of Germany | 426/430 |
| 1516208 | 6/1978 | United Kingdom | 426/428 |

OTHER PUBLICATIONS

Chemical Abstracts, vol. 4, No. 1, Jan. 10, 1910, p. 63.

Primary Examiner—Joseph M. Golian
Attorney, Agent, or Firm—Thomas V. Sullivan; Richard L. Crisona; Thomas R. Savoie

[57] ABSTRACT

A method of lessening the off-flavor notes of low-grade roasted coffee is disclosed. Low-grade green coffee is contacted with a fatty material, preferably a triglyceride, for a period of time between about 15 min. and 60 min. The low-grade green coffee is subsequently separated from the fatty material. Any residual fatty material may be removed by rinsing the low-grade green coffee with acetone. The coffee is then roasted, providing a low-grade roasted coffee having lessened off-flavor notes.

5 Claims, No Drawings

LOW-GRADE COFFEE

TECHNICAL FIELD

The present invention relates to a method of lessening the off-favor notes of low-grade coffee. More particularly, the invention involves contacting low-grade green coffee with a fatty material preferably a triglyceride, and subsequently roasting the low-grade coffee so treated.

BACKGROUND ART

There are at least two commercially recognized botanical varieties of coffee, *Coffea arabica* and *Coffea canephora*. The Arabica coffees are basically of two types, the so-called Brazils and Centrals which are intermediate grade and so-called Milds which come principally from Colombia. The important *canephora* coffees are the Robustas which come primarily from Africa, Indonesia and Ecuador.

Of the two botanical varieties, the Arabica coffees are generally preferred because of their full-bodied aromatic flavor. Robustas are characterized by off-flavors such as earthy, bitter, tarry, or rubber-like flavors. For that reason, the Robusta coffees are typically much less expensive than the more flavorful Arabica coffees. It is therefore desirable to in some way lessen the Robusta off-flavor notes, that is remove the earthy, bitter, tarry or rubber-like notes so that more Robusta coffees can be used either alone or in a blend of Robusta and Arabica coffees without introducing the undesirable flavor notes.

Methods for upgrading the flavor of roasted Robusta coffees are known. For example, U.S. Pat. Nos. 4,226,891 and 4,234,613 both to Lewis teach methods for upgrading the flavor of roasted Robusta coffee. The former patent describes the use of an aqueous acetone solution to upgrade Robusta favor. The latter patent discloses the use of an aqueous alcohol solution to achieve the same results. Although the methods of both patents purportedly upgrade roasted Robusta coffee, care must be taken to prevent damaging those desirable flavor notes present in roasted Robusta coffee while removing the undesirable flavor notes.

It is an object of the present invention to provide a method of lessening the off-flavor notes of low-grade green coffee when said coffee is roasted.

A further object of the present invention is to provide a method of improving the flavor of low-grade coffee which method is safe for use in food processing and is relatively inexpensive.

DISCLOSURE OF THE INVENTION

It has now been discovered that the objects of the invention are met by a method which involves contacting low-grade green coffee with a fatty material. Contact of a low-grade green coffee and fatty material is maintained for between about 15 minutes and 60 minutes whereupon improved low-grade green coffee is separated from the fatty material and said coffee is roasted.

Fatty materials contemplated for use in the present invention are triglycerides, such as any of the edible oils that are commercially available. Examples of suitable triglycerides include safflower oil, corn oil or cotton seed oil. Coffee oil may also be used as the fatty material in the present invention. Said coffee oil has the advantage of being derived from coffee whereas the other fatty material, while entirely suitable, are derived from non-coffee sources. The present invention is not limited to edible oils though. A triglyceride which is solid at room temperature but a liquid at the temperatures described herein is also suitable.

The term "low-grade green coffee" is intended to encompass the lesser quality coffees of both botanical types. As hereinabove noted, Robustas are typically characterized by off-flavor notes and so are well suited to treatment by the present invention. Although the Arabica coffees are generally characterized as having full-bodied aromatic flavor, lesser quality Arabica coffees, such as some of the lower grade Brazilians are known to have undesirable off-flavor notes as well. The method of the present invention is similarly well suited to reducing the off-flavor notes of the lesser quality Arabicas.

Contact of the low-grade green coffee and the fatty material is maintained for between 15 minutes and 60 minutes at a temperature between about 80° C. and 116° C. The contact should not be maintained for too long of a period of time otherwise, the fatty material may begin to decaffeinate the low-grade green coffee as disclosed in U.K. Pat. No. 1,516,208. Decaffeination does not take place at the contact time and temperatures indicated and it is believed this is because the green coffee beans have not been moistened as prescribed in the U.K. disclosure. The beans intended for use in the present invention typically have between 5% by weight and 15% by weight moisture. The temperature of the contact should be high enough so as to upgrade the low-grade green coffee flavor, but the temperature should not be so high as to damage said flavor. It has been found that the preferred contact is at about 115° for about 15 minutes. Contact at the temperature and for the length of time described herein will not lead to significantly any decaffeination of low-grade green coffee.

It is believed, without being limited to any one theory, that the fatty material lessens the off-flavor notes of the roasted Robusta coffee by solubilizing the precursors of the off-flavor notes which precursors are in the green Robusta beans. That is to say that green Robusta beans contain one or more compounds, precursors, that react during roasting to form the off-flavor notes characteristic of Robusta coffee. The fatty material contemplated for use herein solubilizes said precursors which are then no longer present to react in the bean upon roasting.

Contact of the low-grade green coffee and the fatty material may be made in any manner providing good solid-liquid contact. For example, contact may be batch-wise, as where the low-grade green coffee is slurried in the fatty material for the length of time and at the temperature described hereinbefore. The fatty material may also be circulated batch-wise through a bed of low-grade green coffee contained in an elongated column. Alternatively, the contact may be continuous as in a pulsed column arrangement. In such an arrangement, the fatty material is circulated countercurrently through an elongated column of low-grade coffee and fresh low-grade coffee is added at the top of the column as an equal amount of improved low-grade coffee is discharged from the bottom of the column. Whatever the manner of contact, it is important that good solid-liquid contact be maintained throughout.

Once the fatty material and the low-grade green coffee have been contacted for a sufficient period of time, the two are separated. The improved low-grade green coffee may be coated by a residue of fatty material, which residue it is desirable to remove. Said residue is easily removed by rinsing the improved low-grade green coffee in acetone. As the fatty material is readily soluble in acetone, the rinse step should be brief. Although U.S. Pat. No. 4,226,891 to Lewis teaches that roasted Robusta coffee may be improved by contact with an acetone solution, it has been found that contact with the fatty solvent in the present invention improves the flavor more than contact with acetone as per the Lewis process. Thus, a simple acetone rinse at ambient temperature is sufficient to remove the fatty material yet protect the flavor of the Robusta coffee.

After the improved low-grade green coffee has been sufficiently rinsed, said coffee is then dried and ready for further processing, such as roasting. Drying of the green low-grade coffee may be by any means well known in the art. Acetone volatilizes at a temperature less than the boiling point of water so the drying step substantially eliminates any traces of acetone remaining after rinsing. The coffee is conveniently dried by forced convection with heated air at a temperature less than about 120° C. In this way, the beans are dried but no roasting occurs at less than 120° C.

The fatty material, typically a triglyceride, may be made ready for re-use by any of several known methods. For example, the fatty material may be regenerated, that is, made ready for re-use, by steam-vacuum deodorization techniques used in the edible oil industry. Alternatively, the fatty material may be made ready for re-use by the conventional triglyceride oil refining techniques well-known in the art. Such re-use of the fatty material represents a significant cost savings for the instant method. Though relatively inexpensive, the fatty material is most likely too costly to be used once and discarded.

Robusta coffee which has been contacted with the fatty material, rinsed and dried is then roasted to produce a roasted Robusta coffee having lessened off-flavor notes. Roasting of the coffee may be by any conventional means well known in the art. Most commonly, the coffee beans are roasted in hot roaster gas at temperatures of about 540° C. for about 10 minutes. Alternatively, the coffee treated according to the present invention may be roasted in a fluidized bed roaster in less than about 5 minutes, or by other methods obvious to one skilled in the art.

The coffee treated as described herein may be roasted alone or as part of a blend of other higher and lower grade coffees. If roasted separately, the low-grade coffee having lessened off-flavor notes of this invention may be blended with other roasted coffees, both high-grade and low-grade coffees. The roasted low-grade coffee of the instant method may be blended at a higher proportion than would have otherwise been the case. Commercial coffee blends typically contain no more than about 35% by weight Robusta coffee otherwise, the characteristic off-flavors of said strain would become evident. It has been found the low-grade coffees treated as described herein may be blended at up to 50% by weight without the undesirable flavor notes becoming evident. Moreover, it has been found that low-grade beans treated according to the present invention are sufficiently improved so that the flavor of a brew of unblended improved low-grade coffee is acceptable, unlike a brew of unimproved low-grade coffee. As the low-grade coffees tend to be considerably less expensive, the increased usage without any adverse flavor effects represents a significant advantage for the commercial coffee processor and ultimately, for the coffee consumer.

The following examples are intended to illustrate certain embodiments of the present invention, but the examples are not meant to limit the invention beyond what is claimed below.

EXAMPLE 1

1. A portion of green Indonesian Robusta coffee was soaked in an edible oil, sold under the brand name Wesson Oil and believed to be essentially cottonseed oil, at between 80° C. and 90° C. for 1 hour. Aftr that time, the coffee was removed from the oil and allowed to drain.

2. The coffee beans were then rinsed with acetone at ambient temperature.

3. The rinsed Robusta coffee beans were allowed to dry in the air at ambient temperature.

4. The beans were roasted in a 1 lb laboratory roaster made by Jabez Burns. A control sample of untreated Indonesian Robusta coffee was similarly roasted.

5. The two coffees were ground and brewed according to a recipe of 38 g coffee/1780 ml. water.

Both brews had soluble solids contents of about 0.6% by weight. The Robusta coffee treated by the method of the present invention was characterized by a panel of tasters as having less harsh, bitter notes than the control coffee.

EXAMPLE 2

The procedure of Example 1 was repeated on additional portions of Indonesian Robusta coffee. A Hotpoint deep fryer was used for contacting the coffee beans and the fatty material which was again Wesson Oil. Approximately 7.0 kg of fatty material was contacted with 1 kg of beans/run. The results are shown in Table 1 below.

TABLE 1

| Run | Contact Time | Contact Temp (°C.) | Roast Color | Flavor Comment |
|---|---|---|---|---|
| control | — | — | 61 | slight harsh |
| 1 | 15 min. | 68–71 | 61 | clean, weak |
| 2 | 30 min. | 68–71 | 68 | clean, weak |
| 3 | 60 min. | 68–71 | 67 | clean, weak |
| 4 | 15 min. | 85–88 | 72 | clean, weak |
| 5 | 30 min. | 85–88 | 64 | clean |
| 6 | 60 min. | 85–88 | 83 | clean, slight off note |

The off-flavor notes were reduced across the entire range of temperatures and times tested. It is unnecessary to contact the fatty material and the Robusta beans for longer than 15 minutes to obtain some lessening of the off-flavor notes, nor is it harmful to the coffee flavor to contact the two for up to 60 min. Beyond that time however, undesirable decaffeination of the Robusta beans may begin.

EXAMPLE 3

1. Additional portions of Indonesian Robusta coffee were treated in the Hotpoint deep fryer with Wesson Oil. Approximately 4.7 kg fatty material was contracted with 1 kg of beans/run. The contact time was 15 minutes and the runs were at 85° C., 102° C. and 116° C. After contact, the beans were rinsed in acetone and then allowed to dry in air for about 15 hours. The beans were then roasted in the laboratory roaster as in Example 1. The conditions are shown in Table 2 below.

TABLE 2

| Run | Contact Time | Contact Temperature (°C.) | Roast Color |
|---|---|---|---|
| Control | — | — | 61 |
| 1 | 15 min. | 85 | 64 |
| 2 | 15 min. | 102 | 59 |
| 3 | 15 min. | 116 | 58 |

Essentially no caffeine was removed from the green coffee beans.

2. The coffees were ground and brews prepared therefrom at a recipe level of about 57 g coffee/1780 ml water. The brews prepared from the coffees of runs 1–3 were judged "cleaner" (less harsh, off-flavor notes) by an expert panel than the brews prepared from the control coffee.

3. A blend was prepared with 50% by weight of the coffee of run 3 and 50% by weight roasted and ground Colombian Milds and a brew prepared at the same recipe as above. A control blend was prepared with 51% by weight roasted and ground Colombian Milds, 15% by weight roasted and ground Centrals and 34% by weight roasted and ground untreated Indonesian Robustas and a brew prepared therefrom at the same recipe as above.

The brew prepared from the blend containing the Robusta coffee treated according to the present invention was preferred by an expert panel to the brew prepared from the control blend despite the blend of this example having as high as 50% by weight Robusta coffee.

What is claimed is:

1. A method of lessening the off-flavor notes of roasted low-grade coffee which comprises:
    (a) contacting low-grade green coffee with a fatty material at a temperature between about 80° C. and 116° C. for a period of time between about 15 min. and 60 min.;
    (b) separating the low-grade green coffee of (a) from the fatty material;
    (c) removing residual fatty material from the green coffee of step (b) by rinsing said coffee with acetone, separating said coffee from acetone and drying the green coffee prior to roasting; and
    (d) roasting the low-grade coffee of step (c).

2. A method as in claim 1 wherein the fatty material is selected from the group consisting of safflower oil, corn oil, cottonseed oil and coffee oil.

3. A method as in claim 1 wherein the low-grade green coffee is of the Robusta variety.

4. A method as in claim 1 which further comprises blending the roasted low-grade coffee having lessened off-flavor notes of claim 1 with at least one other roasted coffee.

5. A method as in claim 4 wherein said roasted low-grade coffee is blended in a proportion of up to 50% by weight of the blend.

* * * * *